United States Patent [19]

Hartman

[11] Patent Number: 4,613,200
[45] Date of Patent: Sep. 23, 1986

[54] HEADS-UP DISPLAY SYSTEM WITH HOLOGRAPHIC DISPERSION CORRECTING

[75] Inventor: Nile F. Hartman, Westerville, Ohio

[73] Assignee: Ford Motor Company, Dearborn, Mich.

[21] Appl. No.: 629,160

[22] Filed: Jul. 9, 1984

[51] Int. Cl.[4] .............................................. G02B 5/32
[52] U.S. Cl. ...................... 350/3.7; 350/3.72; 350/174
[58] Field of Search ................ 350/3.72, 174, 3.7

[56] References Cited

U.S. PATENT DOCUMENTS

| | | | |
|---|---|---|---|
| 3,508,821 | 4/1970 | Ujhelyi et al. | 353/10 |
| 3,603,668 | 9/1971 | De Bitetto | 350/162 R |
| 3,737,212 | 6/1973 | Antonson et al. | 350/174 |
| 3,807,829 | 4/1974 | Close | 350/3.5 |
| 3,915,548 | 10/1975 | Opittek et al. | 350/3.5 |
| 3,940,204 | 2/1976 | Withrington | 350/3.5 |
| 4,218,111 | 8/1980 | Withrington et al. | 350/3.72 |
| 4,245,882 | 1/1981 | Chang | 350/3.72 |
| 4,309,070 | 1/1982 | St Leger Searle | 350/3.7 |
| 4,372,639 | 2/1983 | Johnson | 350/3.7 |
| 4,447,128 | 5/1984 | Ferrer | 350/174 |
| 4,497,534 | 2/1985 | Sincerbox | 350/3.72 |
| 4,530,564 | 7/1985 | Close | 350/372 |

FOREIGN PATENT DOCUMENTS

| | | |
|---|---|---|
| 0066496 | 8/1982 | European Pat. Off. |
| 8402197 | 6/1984 | PCT Int'l Appl. |
| 1602373 | 5/1977 | United Kingdom |
| 1601457 | 5/1977 | United Kingdom |
| 2042206 | 9/1979 | United Kingdom |

*Primary Examiner*—Bruce Y. Arnold
*Attorney, Agent, or Firm*—Paul K. Godwin, Jr.; Clifford L. Sadler

[57] ABSTRACT

A simplified heads-up display system for projecting a virtual image of a broad-band display source employs a pair of identically constructed reflective holograms, wherein one of the holograms is in the field of view of the observer to correct dispersion and provide the virtual image of the display source within the observers field of view.

8 Claims, 4 Drawing Figures

HEADS-UP DISPLAY SYSTEM WITH HOLOGRAPHIC DISPERSION CORRECTING

BACKGROUND OF THE INVENTION

Field of the invention. The present invention is directed to the field of holographic display systems and more particularly to the area of such systems utilizing broadband displays with dispersion control.

Description of the Prior Art. Systems commonly used in aircraft to display images of instruments in the field of view of a pilot are termed "heads-up displays" (HUD). HUDs generally employ conventional optical elements or holographic elements to project an image of an instrument into the pilot's field of view as the pilot looks through the forward window of the aircraft.

In U.S. Pat. No. 3,737,212 a first system of image projection is indicated in a HUD, wherein the image supplied by a cathode ray tube (CRT) is projected onto a "combining glass" in an aircraft cockpit. The image produced by the CRT is projected by optical elements including a mirror and a lens between the CRT and the combining glass. A second system described in that patent includes a combining glass, in the form of a spherical diffraction lens, which provides an image to the pilot as a consequence of a CRT image source having a concave parabolic face. While the second described system sets forth the desirability of providing a holographically recorded diffraction lens, it also emphasizes the necessity of using CRT's with rare earth doped phosphors that emit high energies of light in narrow wavelength bands, in order to reduce inherent aberrations.

In U.S. Pat. No. 4,218,111 a holographic HUD system is also disclosed. In that system, a complex optical system is used which includes relay lenses containing tilted and decentered optical elements employed to compensate for the aberration present in the holographic optical element used as a combiner.

These prior art patents illustrate conventional approaches to achieving a visibly perceivable HUD image against a bright background. However, the use of exotic phosphors to achieve bright narrow-band display illumination or expensive optics to provide image correction for broader-band sources have prevented widespread use of this otherwise desirable display concept.

SUMMARY OF THE INVENTION

The present invention is intended to solve the problems of the prior art HUDs and provide a low cost, high image quality HUD system. In this invention, a pair of reflective holographic optical elements (HOE) are utilized to achieve holographic dispersion correction and allow for a broadband light source to produce a highly contrasted image to the viewer.

Because of its simplicity and reliability qualities, the present invention is inherently suited for use in an automotive environment and the preferred embodiment is so shown. However, it is foreseen that the present invention could be employed to many environments where HUD systems are desired. Such environments could include aircraft, trucks, video games, simulators or other displays where it is desired to superimpose visual indicia in the field of view of an individual.

In the automotive environment, the present invention employs one of the HOEs installed in the windshield within the field of view of an intended driver. A second reflective HOE is installed under the dashboard of the vehicle. The system generates an image of display instrumentation that is superimposed in the driver's forward field of view through the windshield. The display source, in this instance, is a vacuum fluorescent display (VFD) that has a fairly broadband spectrum (on the order to approximately 460–580 nm). The two reflective HOEs are constructed utilizing a fairly central wavelength for the object and reference beams with respect to the display source spectrum. Those HOEs, when properly mounted, in combination with the display source, provide a virtual image of the VFD indicia, free from the chromatic dispersion that typically characterizes holographic display techniques. Because the optical elements of the system are holographically recorded, a lensing function can be incorporated into the elements during recordation. As a result, a virtual image, free of chromatic aberrations, is observable at a specified position.

DETAILED DESCRIPTION OF THE PREFERRED EMBODIMENT

Figure 1:
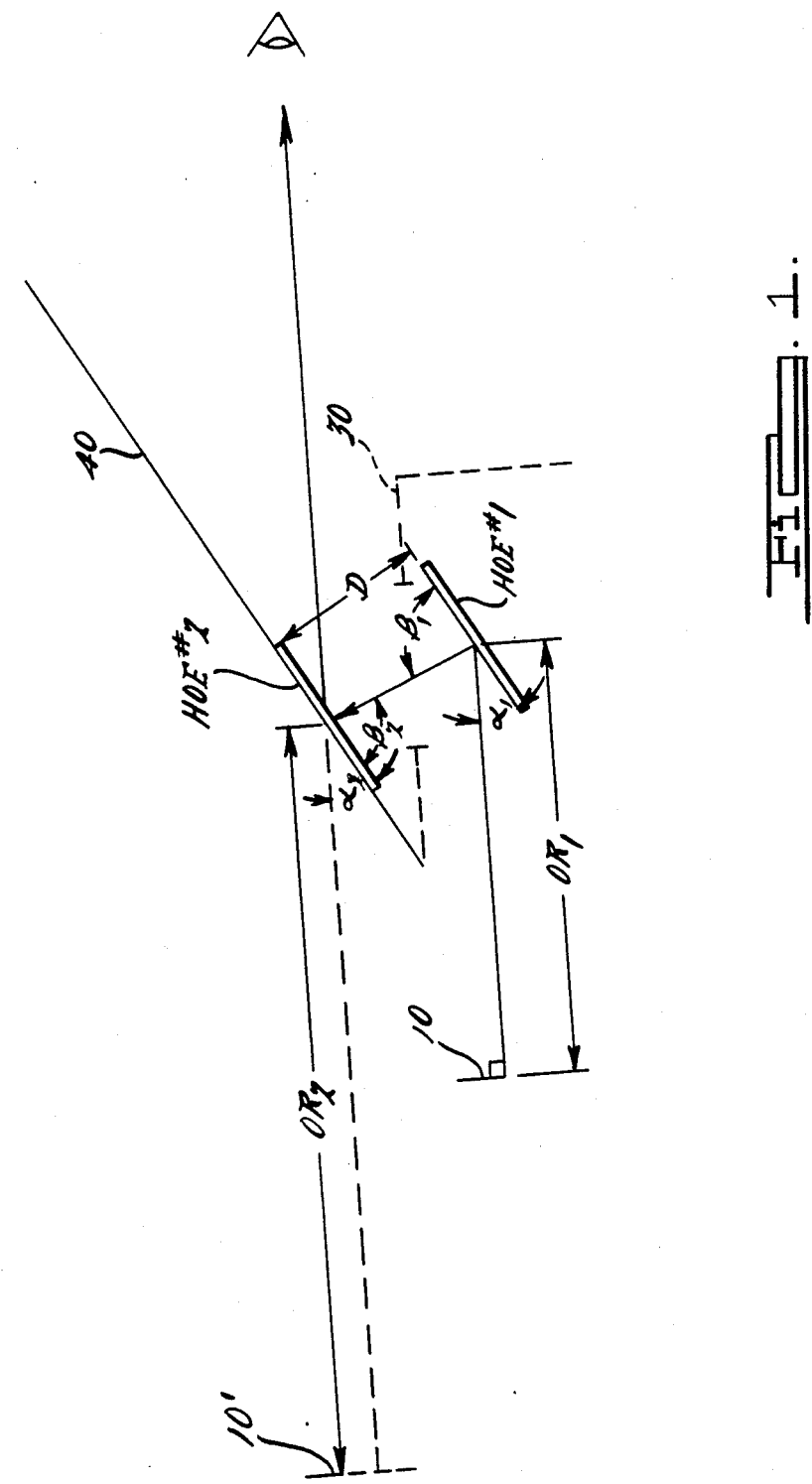
FIG. 1 illustrates the preferred embodiment of the present invention.

The heads-up display system (HUD) of the present invention is shown in FIG. 1 as utilizing two parallel holographic optical elements HOE#1 and HOE#2 to project a virtual image 10', of an indicia display source 10. The virtual image 10' is superimposed in the driver's field of view as the driver looks at the forward scene through the windshield 40. In the preferred embodiment, the HOE#2 is part of the laminate or is attached to the windshield 40 of a vehicle. The second element is located under the dash 30, out of the direct viewing path of the driver. The indicia display source 10, in the preferred embodiment, is a conventional broadband vacuum fluorescent display (VDF) of the type commonly employed in some Ford Motor Company vehicles to digitally indicate the vehicle speed. That display source 10 is merely illustrative of many available broadband sources that may be employed. The angle $\alpha_1$ represents the relationship of a direct line from a midpoint of the VFD on a plane 10 to the midpoint of the HOE#1. The angle $\alpha_2$ represents the predicted relationship of the desired line of sight between the driver's eyes and the virtual image at 10' to the midpoint of the HOE#2 attached to the windshield 40. The angle $\beta_1$ represents the diffraction angle of a ray of light at the construction wavelength incident on the HOE#1 at the angle $\alpha_1$. The angle $\beta_2$ represents the incidence angle on the HOE#2 of the ray diffracted by HOE#1. The angles $\alpha_1$, $\alpha_2$, $\beta_1$ and $\beta_2$, as well as distances D and $OR_1$, are selected as a result of the slope of the windshield 40, the predicted location of the driver's eyes, the desired location of the virtual image plane 10' and the space constraints under the dashboard 30.

Figure 2:
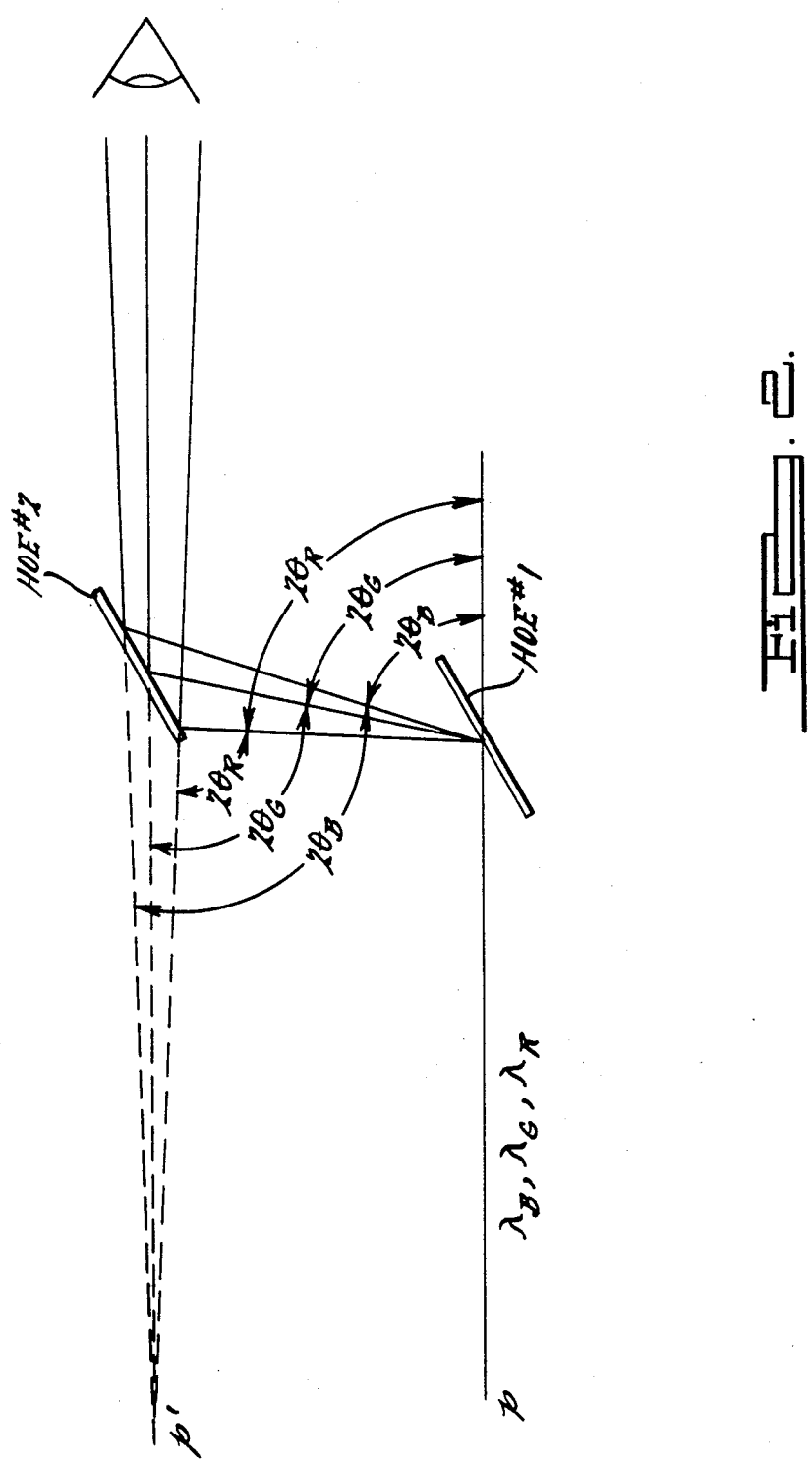
FIG. 2 is a ray trace diagram illustrating dispersion correction by the present invention.

FIG. 2 represents a ray tracing model to illustrate the chromatic dispersion correction mechanism of the system. Reflective HOE#1 represents the element positioned under the dashboard 30 of the automobile and ideally parallel to reflective HOE#2 that is coplanar with the windshield 40. A ray originating from a point P on the VFD 10 emitting face and impinging on HOE#1 is polychromatic and is represented as containing wavelengths $\lambda_B$ (blue), $\lambda_G$ (green) and $\lambda_R$ (red). The relationships between the wavelengths are such that $\lambda_B < \lambda_G < \lambda_R$.

Both HOE#1 and HOE#2 behave as Bragg type diffraction gratings causing the incident beams to be diffracted and dispersed at angles related to the wavelength of the incident light. The behavior of each diffracted light beam can be described by the familiar Bragg equation $$2nd \sin \theta_{Br} = \lambda : \theta_{Br} = \arcsin(\lambda)/2nd$$

where
- d = grating spacing,
- n = refractive index of medium,
- $\lambda$ = wavelength of an incident beam, and
- $\theta_{Br}$ = the half-angle between the transmitted incident and diffracted ray, Bragg angle When reflective HOE#1 and HOE#2 are chosen to be geometrically identical in construction, the diffracted rays from HOE#1 are used in reconstructing the virtual image of the point source in HOE#2. The inherent wavelength dispersion of the diffracted $\lambda_B$, $\lambda_G$ and $\lambda_R$ rays from HOE#1 at $2\theta_B$, $2\theta_G$ and $2\theta_R$ respectively, causes those rays to impinge on HOE#2 at different angles of incidence (exaggerated in FIG. 2). The incident rays on HOE#2 are, in turn, diffracted by HOE#2, according to the Bragg equation. The diffracted rays from HOE#2 are thereby dispersion corrected and appear to originate from a virtual image point P' on the opposite side of the HOE#2 from which it is viewed. Thus, the image is recombined as a virtual image of point P appearing at P', free of chromatic dispersion.

The generation of an image, free from dispersion, requires the use of two reflective holograms with nearly identical grating characteristics. If the grating characteristics differ significantly, that is if $\theta_{Br}$ varies by more than a few degrees (5°) for the two holograms, some dispersion will be evident to the viewer as smearing of the image. In addition, the two holograms must be properly aligned with respect to each other to ensure the generation of an image of optimum quality and maximum image brightness.

Figure 3:
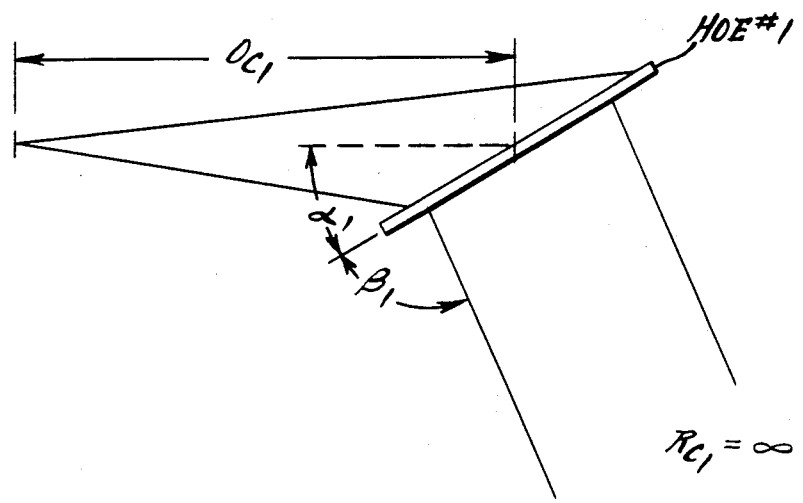
FIG. 3 illustrates the construction technique used to form one of the reflective holographic optical elements shown in FIG. 1.
Figure 4:
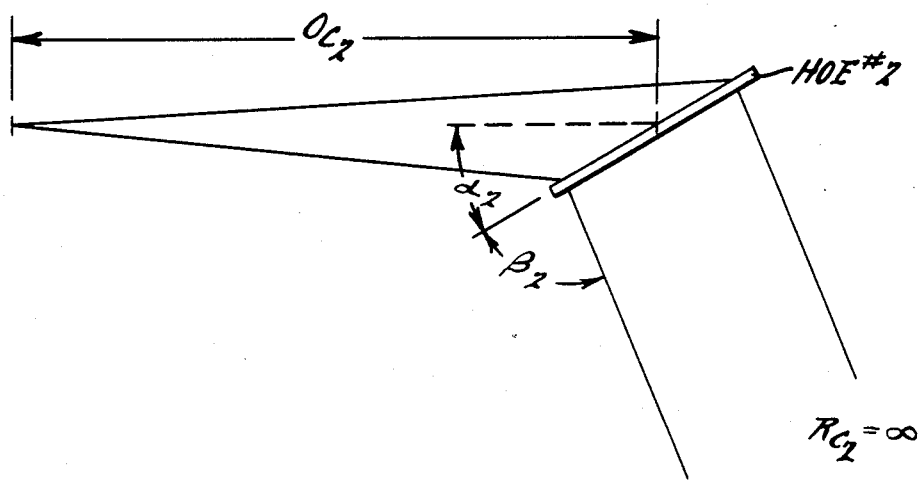
FIG. 4 illustrates the construction technique used to form the other of the reflective holographic optical elements shown in FIG. 1.

FIGS. 3 and 4 illustrate the geometries utilized in the fabrication of the two reflective holographic elements for the present invention. The two elements are constructed as non-image bearing holograms utilizing a monochromatic point source object beam and a collimated monochromatic reference beam of a wavelength that is selected to be centered in the broad-band of wavelengths generated by the VFD 10.

The focal length of the HOEs manufactured in the geometrically identical configuration are defined by the distance of the monochromatic point source forming the diverging object beam from the plane of the recording medium plate. In this case, the focal properties of HOE#1 in FIG. 3 can be described by the simple thin lens equation:

$$\frac{1}{O_{C1}} + \frac{1}{R_{C1}} = \frac{1}{f_{C1}}$$

where
- $O_{C1}$ = separation of diverging beam and recording plate, object beam
- $R_{C1}$ = separation of the photo plate and point source forming reference beam, and
- $f_{C1}$ = focal length of HOE In the configuration shown in FIGS. 3 and 4 the reference beam is collimated. Therefore, $R_{C1}$ and $R_{C2} = \infty$.

Thus, the equation for HOE#1 reduces to the form $$\frac{1}{O_{C1}} = \frac{1}{f_{C1}}$$

and $$f_{C1} = O_{C1}$$

Similarly, the focal length of HOE#2, constructed as illustrated in FIG. 4, is $$f_{C2} = O_{C2}$$

The focal length of each resulting reflective HOE is defined as the object beam path length, in these recording configurations.

As in conventional optics, a sign convention must be established. In this instance, the convention is defined by the construction configuration. By definition, the side of the hologram from which the incident object beam originates during the construction stage, the left side in FIGS. 3 and 4 is specified as the negative axis while the opposite axis is specified as the positive axis. This sign convention is also carried through to the reconstruction stage.

The position of the virtual image 10' illustrated in FIG. 1 relative to the windshield is defined by the following equation:

$$\frac{1}{O_{R2}} = \frac{1}{O_{C2}} - \frac{1}{\frac{O_{C1} O_{R1}}{O_{R1} - O_{C1}} + D}$$

where
- $O_{C2}$ = separation of point source of the diverging beam (object beam) and recording medium used to fabricate reflective HOE#2 (focal length of HOE#2)
- $O_{C1}$ = separation of point source of the diverging beam (object beam) and recording medium used to fabricate reflective HOE#1 (focal length of HOE#1)
- $O_{R1}$ = separation of display panel 10 and reflective HOE#1
- D = separation of HOEs, and
- $O_{R2}$ = location of HUD image relative to the reflective HOE#2

In the equation, the subscripts 1 and 2 refer to the appropriate HOE while the subscripts R and C refer to reconstruction and construction conditions, respectively.

The magnification of the displayed image is defined by the ratio of the distance of the vertical image 10' from the windshield hologram, HOE#2, to the path length of the diverging object beam used to construct the windshield hologram. The magnification can be determined using the following equation.

$$m = \frac{O_{C_1}O_{R_1} + D(O_{R_1} - O_{C_1})}{O_{C_1}O_{R_1} + (O_{R_1} - O_{C_1})(D - O_{C_2})}$$

Since the magnification of the HUD image is controlled by the proper choice of the construction and reconstruction parameters, the system allows the HUD image to be selectively positioned over a large range of distances relative to the windshield and provides for a variable image magnification.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. A holographic head up display system comprising:
a source of broad-band radiation generating a visible image;
a first reflective hologram having optical power and positioned to reflectively diffract said image radiation;
a second reflective hologram having optical power and positioned substantially parallel to said first reflective hologram to reflectively diffract said image radiation diffracted from said first hologram towards a viewer, whereby said image appears to said viewer as a virtual image of said source of broad-band radiation superimposed on the viewer's direct field of view through the second hologram.

2. A diplay system as in claim 1, wherein said first and second reflective holograms are geometrically identical in construction and contain identical diffraction patterns.

3. A system as in claim 2, wherein said second hologram is mounted on the windshield of a vehicle and said image source and first hologram are mounted below said windshield out of the direct vision of said viewer.

4. A system as in claim 1, wherein both said holograms are non-image bearing elements created by the interference of radiation from a point source and from a collimated beam.

5. A holographic head up display system comprising:
a broad-band illuminated source of indicia;
a first reflective holographic recording having optical power and positioned to diffract illumination from said source of indicia;
a second reflective holographic recording having optical power and positioned generally parallel to said first recording for diffracting said diffracted illumination toward a viewer whereby a virtual image of said indicia appears superimposed on the viewer's direct field of view through said second holographic recording.

6. A display system as in claim 5, wherein said first and second reflective holographic recordings are identically recorded to contain identical diffraction patterns.

7. A display system as in claim 5, wherein said first and second reflective holographic recordings are identically recorded with non-image bearing diffraction patterns created by the interference of radiation from a point source and from a collimated beam.

8. A system as in claim 7, employed in an automotive vehicle, wherein said source of indicia and said first reflecting holographic recording are located beneath the dashboard of said vehicle, said second reflective holographic recording is co-planar with the windshield of said vehicle and said virtual image appears to a driver of said vehicle as being external to said windshield.

* * * * *